United States Patent [19]

David

[11] Patent Number: 5,571,225
[45] Date of Patent: Nov. 5, 1996

[54] DRIVE ARRANGEMENT AND METHOD FOR INSTALLING SUCH ARRANGEMENT IN A MACHINE

[75] Inventor: Jerry J. David, Franklin, Wis.

[73] Assignee: Harnischfeger Corporation, Brookfield, Wis.

[21] Appl. No.: 435,747

[22] Filed: May 5, 1995

[51] Int. Cl.$^6$ .................................................. F16N 57/02
[52] U.S. Cl. ........................... 37/307; 74/606 R; 384/559
[58] Field of Search ............................. 37/307, 308, 309; 74/412 R, 410, 421 A, 421 R, 467, 606 R, 661; 384/537, 559, 584, 585

[56] References Cited

U.S. PATENT DOCUMENTS

| | | | |
|---|---|---|---|
| 3,563,353 | 2/1971 | LoPresti | 74/412 R X |
| 4,261,225 | 4/1981 | Zahradnik | 74/412 R X |
| 4,496,199 | 1/1985 | Vertenstein et al. | 384/559 X |
| 5,178,027 | 1/1993 | Kobayashi et al. | 74/412 R |
| 5,447,078 | 9/1995 | Robinson, Jr. et al. | 74/421 A X |

FOREIGN PATENT DOCUMENTS

| | | |
|---|---|---|
| 2704083 | 8/1977 | Germany. |
| 0632859 | 11/1978 | Sweden. |

*Primary Examiner*—Terry Lee Melius
*Assistant Examiner*—Robert Pezzuto
*Attorney, Agent, or Firm*—Jansson & Shupe, Ltd.

[57] ABSTRACT

The new drive arrangement involves a machine having upper and lower decks with respective upper and lower openings through them. The drive arrangement includes a flanged bearing housing attached to the lower deck. The upper opening and the bearing housing are configured to permit the bearing housing to pass through the upper opening. The flange is attached to the upper surface of the lower deck member and so configured and arranged, the drive arrangement may be installed through the upper opening. The new drive arrangement may be fully assembled with bearing, bearing housing, grease trap and pinion gear for mounting "top down" onto the deck members, thereby eliminating the need for bottom access and greatly simplifying initial installation and later repair.

11 Claims, 5 Drawing Sheets

DRIVE ARRANGEMENT AND METHOD FOR INSTALLING SUCH ARRANGEMENT IN A MACHINE

FIELD OF THE INVENTION

This invention relates generally to machinery and, more particularly, to machinery configured for ease of initial assembly and later field maintenance.

BACKGROUND OF THE INVENTION

With many types of machines, especially those used in and around the home, the relative ease with which they can be assembled and/or later partially disassembled for repair is generally not a compelling concern to either the manufacturer or the user. Particularly with mass-produced machines, assembly is repetitive by trained workers and the parts are easy to handle, either manually or by using appropriate equipment. Later repair may, if simple, be effected by the user or if more complicated, by a trained service person.

And the economic consequences of having such machine inoperative for a period of time are inconsequential or nil. Machines such as household appliances, wrist watches and the like are examples of such machines.

In sharp contrast, industrial machinery (for, e.g., manufacturing, construction, mining and the like) involving a substantial capital expenditure comes under much closer scrutiny when ease of assembly and later repair are being considered. In fact, assembly and repair (with attendant machine "downtime") can have a major economic impact on overall operating costs and are important factors in the buying decision. Buyers are more willing to pay a higher initial price for a machine which is easy to assemble and repair.

Some types of machinery are simply too large to make and ship as a single unit; they must be shipped in sections and pieces and assembled at the point of use. Machines known as draglines are but one example. It is apparent why ease of assembly becomes an important consideration. And if the machine is at a remote site and requires auxiliary equipment such as a crane or the like for assembly or to perform field repair, the costs associated with the machine escalate.

To cite but one example of a type of machine requiring field assembly, a known dragline has an upper machinery housing that is supported by and pivotably rotates on a ring-like structure. Rotation is by a drive arrangement having electric motors driving shafts, the pinion gears of which engage such structure.

When the dragline is assembled on site, components of the partially-disassembled drive arrangement are lowered onto and mounted to a machinery deck. A disadvantage of a known dragline is that the remaining components, e.g., the lower shaft bearing, bearing housing and pinion gear, must be separately installed from beneath the deck. Working space (between the deck and what is known as the "tub") is cramped and the components are very heavy and difficult to work with. And the time required to effect assembly or to perform later repair is, in view of the invention, unnecessarily extended.

Another disadvantage of the known drive arrangement is that the lower shaft bearing is retained in location on the shaft by the pinion and related hardware mounted at the shaft end. The pinion cannot be removed without also running the risk that the bearing might fall from the shaft.

Yet another disadvantage of the known arrangement is that if the bolts holding the bearing housing body become loosened or fall off, such body moves under force of gravity. The machine is very likely to be disabled thereby.

And the bearing housing is of the split type having two C-shaped halves. The halves of a split housing are easier to handle but more difficult to manufacture.

An improved drive arrangement overcoming some of the problems and shortcomings of the known drive arrangement would be an important advance in the art.

OBJECTS OF THE INVENTION

It is an object of the invention to provide a new machine drive arrangement overcoming some of the problems and shortcomings of the known drive arrangement.

Another object of the invention is to provide a new drive arrangement which is easy to assemble and disassemble in the field.

Another object of the invention is to provide a new drive arrangement which can be assembled "top-down" on the machine.

Yet another object of the invention is to provide a new drive arrangement which may be fully assembled before mounting it on the machine.

Another object of the invention is to provide a new drive arrangement which substantially eliminates the need for below-deck work on such arrangement.

Another object of the invention is to provide a new drive arrangement which has a lower shaft bearing retained by means other than by the pinion and related hardware.

Yet another object of the invention is to provide a new drive arrangement in which the pinion can be removed without disturbing the lower shaft bearing.

Another object of the invention is to provide a new drive arrangement permitting removal and replacement of the pinion gear without removing the drive shaft to which the pinion is attached.

Still another object of the invention is to provide a new drive arrangement on which the bearing housing body is prevented from moving under force of gravity.

Another object of the invention is to provide a new drive arrangement which significantly reduces machine downtime. How these and other objects are accomplished will become more apparent from the following descriptions and from the drawings.

SUMMARY OF THE INVENTION

The invention involves a drive arrangement particularly well suited for a machine that has drive components in a location to which access for mounting and repair is very difficult. An exemplary machine has upper and lower deck members with respective upper and lower openings through the members. The drive arrangement includes a bearing housing having a flange attached to the lower deck member.

In the improvement, the upper opening and the bearing housing are cooperatively configured to permit the bearing housing to pass through the upper opening and the flange is attached to the upper (rather than the lower) surface of the lower deck member. So configured, the entire drive arrangement may be installed "top down" through the upper opening rather than being required to have some parts installed from the underside. The need for bottom access is eliminated and initial installation and later repair are greatly simplified.

In a more specific aspect of the invention, the arrangement has a bearing in the housing and the housing is preferably a one-piece housing and includes a bearing support rim beneath such bearing. The rim prevents the bearing from falling from the housing, thereby reducing the possibility of a situation which might require underside access.

To prevent bearing grease from dripping onto the machine or to the ground, there is a grease trap below the bearing housing. The upper opening and the grease trap are also cooperatively configured to permit the grease trap to pass through the upper opening.

In another aspect of the invention, the drive arrangement includes a longitudinal axis and a shaft extending along the longitudinal axis. Such shaft has an input portion and an output portion and the bearing is assembled to the shaft intermediate the portions. The one-piece bearing housing surrounds and is assembled to the bearing and there is a pinion gear assembled to the output portion.

Considered as a combination, the drive arrangement is above the upper deck member and oriented so that its longitudinal axis is generally aligned with the deck axis, i.e., an axis transverse to the deck plates. The shaft, the bearing, and the gear are cooperatively sized with the openings to fit through such openings while the flange and the lower opening are cooperative sized to prevent the flange from fitting through such lower opening.

The fully assembled drive arrangement may be mounted on the machine by lowering such drive arrangement along the deck axis. To put it another way, one need not first mount a partially assembled arrangement and then complete assembly by gaining access to, for example, the underside of the lower deck member.

In a highly preferred combination, the drive arrangement includes a grease trap and it, too, is assembled to the shaft intermediate the bearing and the gear. The grease trap and the lower opening are cooperatively sized to permit the grease trap to fit through the lower opening during assembly.

The invention also involves a new method for mounting a drive arrangement on a machine. The method includes the steps of assembling a bearing and a bearing housing to the shaft, lowering the bearing, bearing housing and shaft through the machine upper opening and then coupling the attachment flange to the lower deck member. Preferably, the attachment flange is mounted to the upper surface of such lower deck member.

In a more specific aspect, the assembling step includes assembling a pinion gear to the shaft and the lowering step includes lowering the pinion gear through both openings. Such assembling step also includes assembling a grease trap to the shaft and the lowering step includes lowering the pinion gear and the grease trap through both openings.

Further details regarding the invention are set forth in the following detailed description and in the drawings.

DETAILED DESCRIPTION OF PREFERRED EMBODIMENTS

Figure 1:
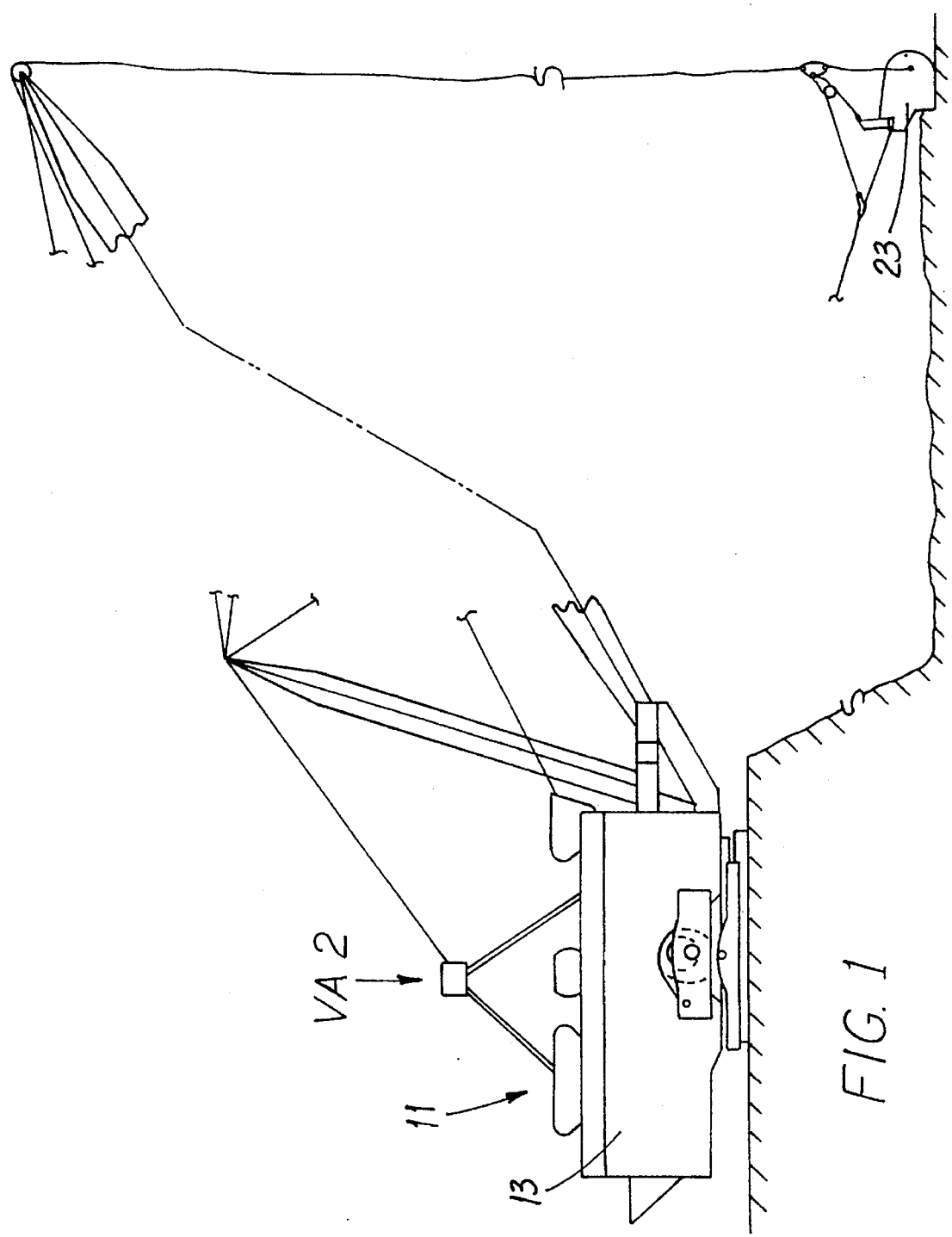
FIG. 1 is a representative side elevation view of a dragline, an exemplary type of machine with which the invention can be used.
Figure 2:
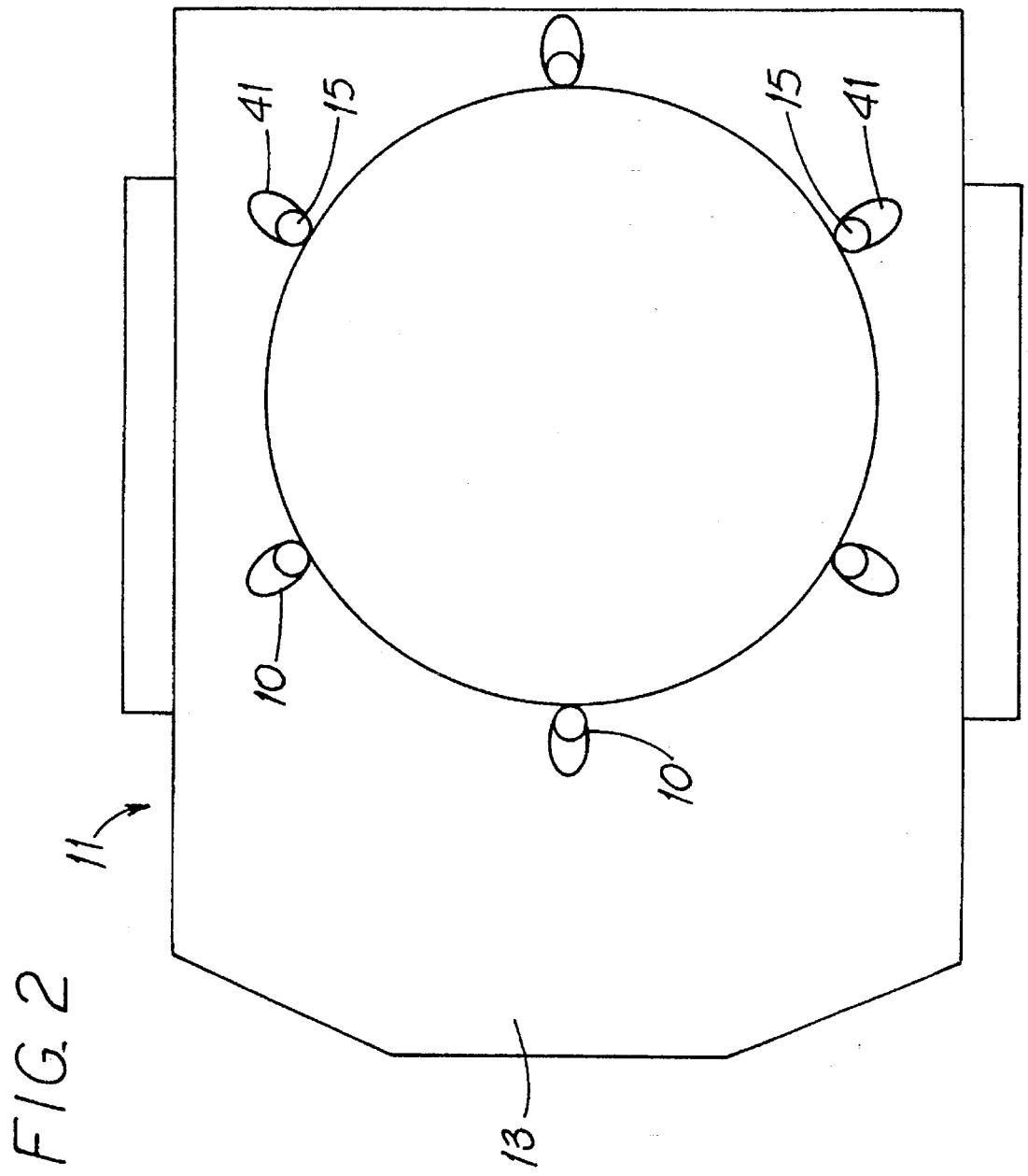
FIG. 2 is a simplified top plan view of the dragline of FIG. 1 taken along the viewing axis VA2 and showing the drive arrangements used to pivot the dragline housing.
Figure 3:
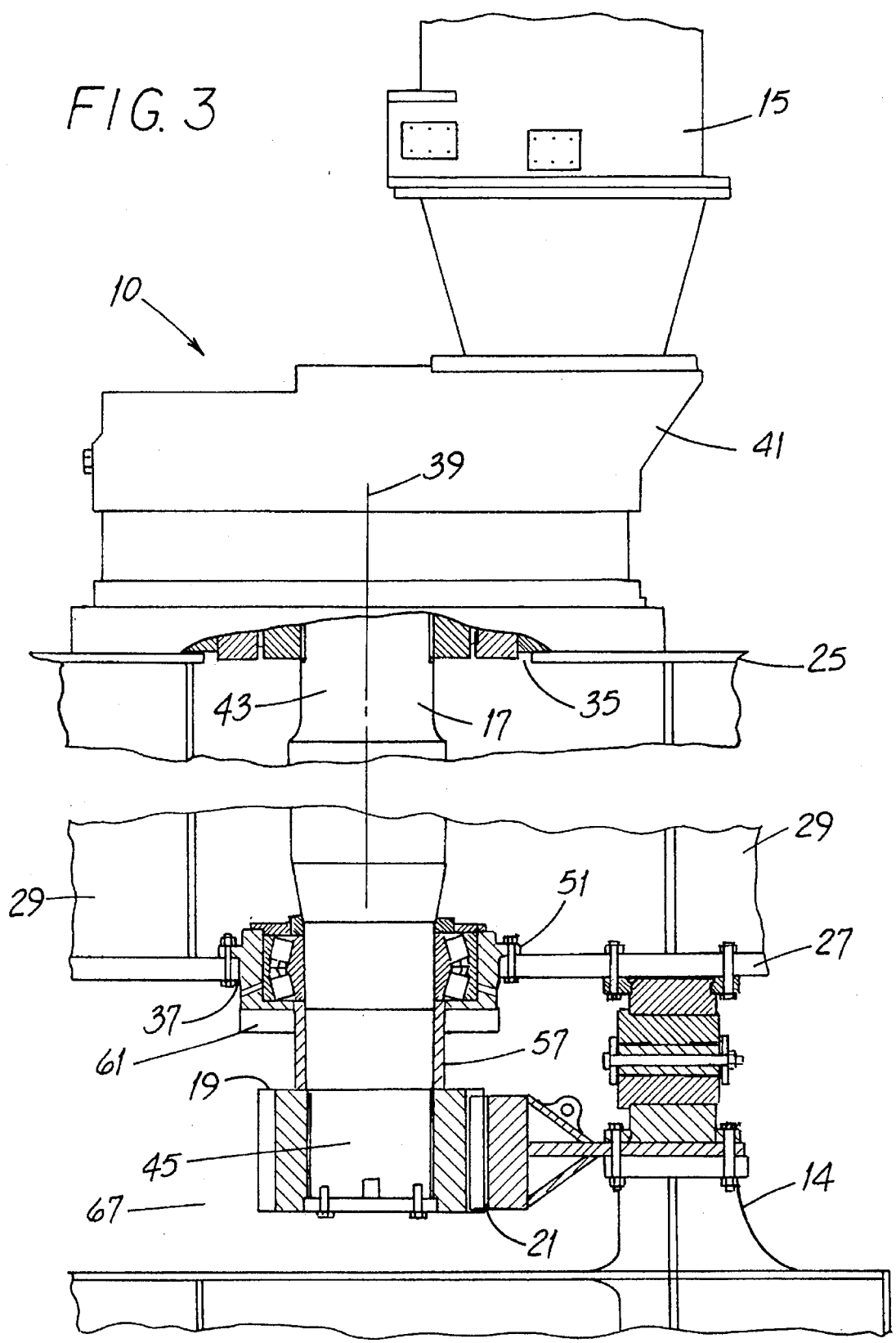
FIG. 3 is a side elevation view, partly in section, of one of the drive arrangements shown in conjunction with the machine mounting deck. Parts are broken away.

Before describing the new drive arrangement 10 and method, it will be helpful to have an understanding of one type of machine on which such arrangement can be used. Referring to FIGS. 1, 2 and 3, the machine 11 is an exemplary dragline having an upper machinery housing 13 which pivots on a structure 14. Pivoting is by several drive arrangements 10, each having an electric motor 15 driving a shaft 17, often through a gear box. The pinion gear 19 engages gear teeth 21 on such structure 14.

As the rear-facing bucket 23 is drawn toward the machine 11, such bucket 23 fills with rock, earth, coal or the like. And when it is filled, the bucket 23 is hoisted and the housing 13 pivoted in one direction or the other so that the bucket contents may be placed on a spoil pile.

Figure 4:
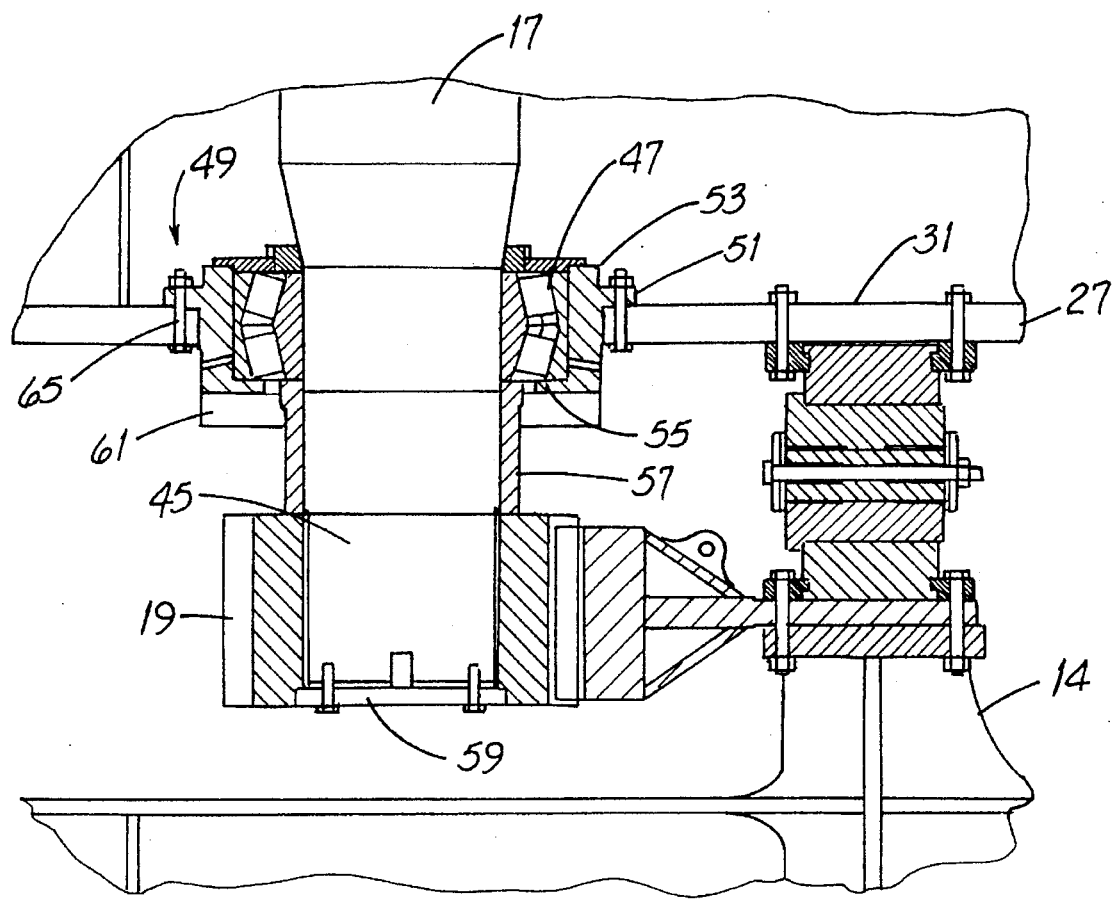
FIG. 4 is an enlarged side elevation view, partly in section, of a portion of the drive arrangement shown in FIG. 3.
Figure 5:
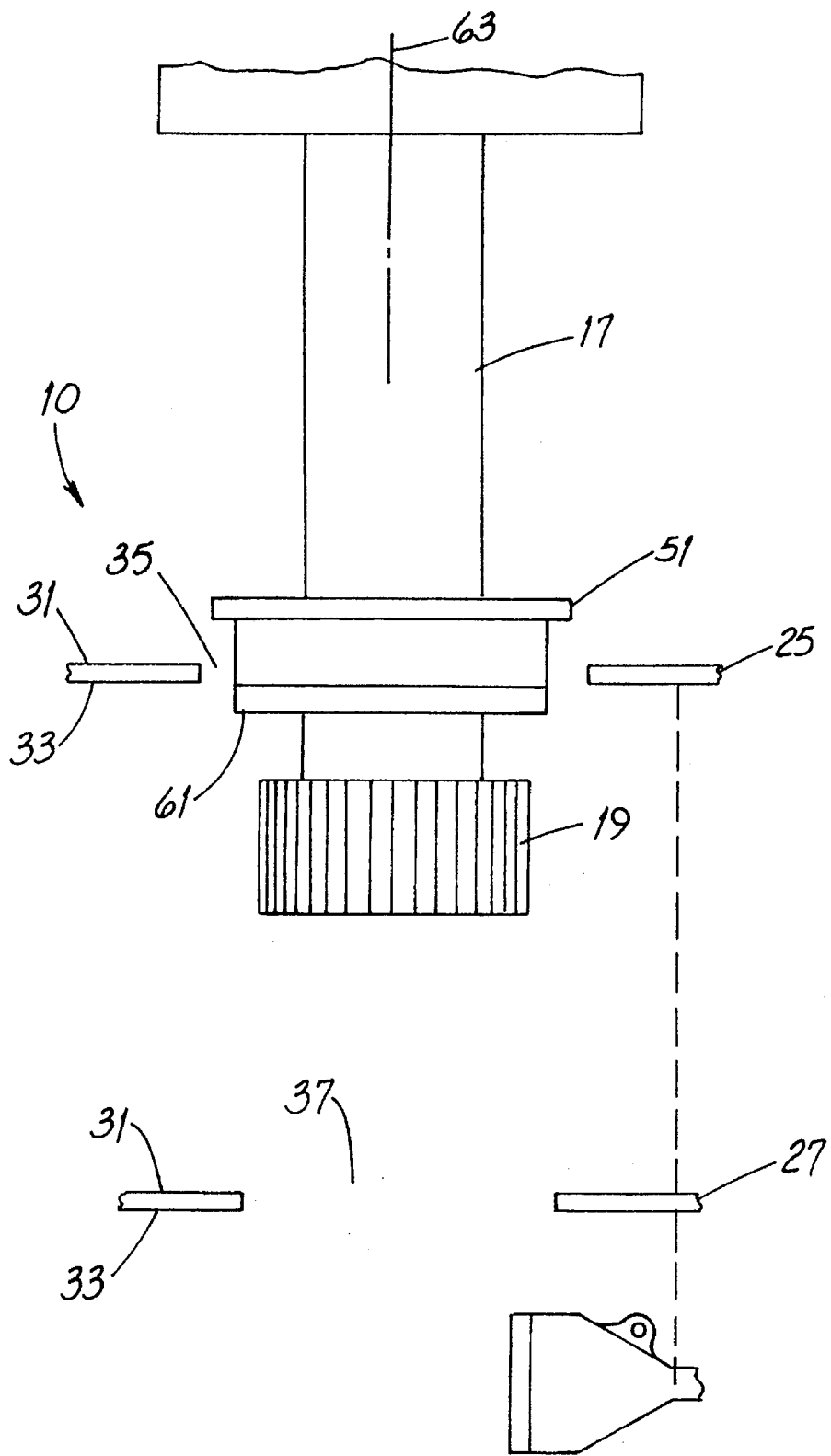
FIG. 5 is a simplified side elevation view illustrating how a fully-assembled drive arrangement is mounted on the machine.

Referring further to FIGS. 1, 2, and 3 and also to FIGS. 4 and 5, the dragline housing 13 has upper and lower deck members 25 and 27, respectively. Such members 25, 27 are generally flat and parallel and are braced by support ribs 29. Each deck member 25, 27 has an upper and a lower surface 31 and 33, respectively. The upper member 25 has an upper opening 35 through it, the lower member 27 has a lower opening 37 through it and the openings 35, 37 are coincident with the transverse deck axis 39. It is to be noted that the two openings 35, 37 (which are preferably circular) are of disparate size and that the diameter of the upper opening 35 is greater than that of the lower opening 37.

More specifically, the drive arrangement 10 has a upper gearbox 41 to which is mounted the drive motor 15. Extending downward from the gear box 41 and along a longitudinal axis 39 is the drive shaft 17 which has a power input portion 43 and a power output portion 45. The pinion gear 19 is mounted to the output portion 45 and its teeth engage the gear teeth 21. It is apparent from this brief description that when the motors 15 are energized, the dragline housing 13 rotates on the structure 14.

Referring particularly to FIG. 4, a lower shaft bearing 47 (of the spherical roller bearing type) is assembled to the shaft 17 intermediate the portions 43, 45 and a surrounding bearing housing 49 is assembled to the bearing 47. Such housing 49 has an annular flange 51 extending outwardly from the housing body 53.

When the drive arrangement 10 is mounted on the machine 11, the flange 51 contacts and rests upon the upper surface 31 of the lower member 27 and is bolted to such member 27. To put it another way, the flange 51 and the lower opening 37 are cooperatively sized so that the body 53 fits into such opening 37 with only slight clearance but the flange 51 is prevented from fitting through such opening 37. And the flange 51 and upper opening 35 are cooperatively sized so that the flange 51 can be fitted through such opening 35 with relative ease.

The housing 49 (which is preferably made as one piece) has a bearing support rim 55 extending radially inward. The bearing 47 contacts such rim 55 and is supported thereby.

A sleeve 57 is below the bearing 47 and between such bearing 47 and the pinion gear 19. The gear 19 is held in place by a retention plate 59 affixed to the shaft output portion 45 by cap screws or the like. It is to be noted that because of the support rim 55, the plate 59, pinion gear 19 and sleeve 57 may be downwardly removed from the shaft 17 without disturbing the bearing 47 or the housing 49.

Referring further to FIGS. 3 and 4, an annular "can-like" grease trap 61 is below the bearing 47, the housing 49 and the rim 55. Grease which works its way through the bearing 47 is deposited in the trap 61 rather than dripping on the structure 14 or falling to the ground. It is also to be noted that the openings 35, 37 and the grease trap 61 and pinion gear 19 are cooperatively sized so that such trap 61 and gear 19 can fit through both openings 35, 37 with relative ease.

For the following part of the description, it is assumed that the drive arrangement 10 (including the shaft 17) have been removed from the machine 11 for repair, that repair has been effected and that, as shown in FIG. 5, such arrangement 10 is prepared for remounting on the machine 11.

The bearing 47, bearing housing 49 and grease trap 61 are assembled to the shaft 17 and the sleeve 57 urged against the bearing 47, the latter being retained by the support rim 55. The pinion gear 19 is attached to the output portion 45 and secured there by the plate 59, thus securing the sleeve 57 and bearing 47 in position.

Thereupon, the bearing 47, bearing housing 49 and shaft 17 are lowered through the machine upper opening 35. The grease trap 61, the sleeve 57, the shaft output portion 45 and the pinion gear 19 are all lowered through both openings 35, 37 and lowering is in such a way that the shaft axis 63 is maintained generally coincident with the deck axis 39. When the attachment flange 51 contacts the upper surface 31 of the lower deck member 27, such flange 51 is mounted to such upper surface 31 using the bolts 65 for the purpose.

From the foregoing, it is to be appreciated that the shaft 17 (and the lower shaft bearing 47, the bearing housing body 53, the sleeve 57, the pinion gear 19 and the retention plate 59) are pre-assembled before being lowered downward for mounting. And if (contrary to the above assumption) the drive arrangement 10 is being mounted as part of initial assembly, such pre-assembly can be performed at the factory. In either event, there is no need to have a worker in the cramped space 67 for attaching the pinion gear 19 or any other parts. And one is able to remove the pinion gear 19 without removing the drive arrangement 10 including its shaft 17.

And it is also to be appreciated that with the drive arrangement 10 mounted as shown in FIG. 3, the pinion gear 19 and sleeve 57 can be removed if necessary without risking the loss of the bearing 47. Such bearing 47 is held in place by the rim 55 which, in turn, is held in place by the flange 51 attached to the deck member 27.

While the principles of the invention have been shown and described in connection with only a few embodiments, it is to be understood clearly that such embodiments are by way of example and are not limiting.

What is claimed:

1. A drive arrangement for a machine having upper and lower deck members with respective upper and lower openings therethrough, and wherein (a) the lower deck member has an upper surface, and (b) the drive arrangement includes a bearing housing having a flange attached to the lower deck member, the improvement wherein:

the upper opening and the bearing housing are cooperatively configured to permit the bearing housing to pass through the upper opening; and the flange is attached to the upper surface of the lower deck member, whereby the drive arrangement is configured to be installed through the upper opening.

2. The drive arrangement of claim 1 including a bearing in the housing and wherein:

the housing includes a bearing support rim beneath the bearing, whereby the bearing is prevented from falling from the housing.

3. The drive arrangement of claim 2 wherein the housing is of one-piece construction.

4. The drive arrangement of claim 1 including a grease trap below the housing and wherein the upper opening and the grease trap are cooperatively configured to permit the grease trap to pass through the upper opening.

5. The drive arrangement of claim 3 including a grease trap below the housing and wherein the upper opening and the grease trap are cooperatively configured to permit the grease trap to pass through the upper opening.

6. In combination, a drive arrangement and a machine, and wherein:

the machine has upper and lower deck members with respective upper and lower openings therethrough and oriented along a deck axis;

the lower deck member has an upper surface; and wherein:

the drive arrangement includes (a) a shaft extending along a longitudinal axis and having an input portion and an output portion, (c) a bearing assembled to the shaft intermediate the portions, (d) a bearing housing surrounding and assembled to the bearing and having a flange for attachment to the lower deck member, and (e) a gear assembled to the output portion;

and wherein:

the drive arrangement is above the upper deck member;

the longitudinal axis is generally aligned with the deck axis;

the shaft, the bearing, and the gear are cooperatively sized with the openings to fit therethrough; and the flange and the lower opening are cooperative sized to prevent the flange from fitting therethrough.

7. The combination of claim 6 wherein:

the drive arrangement includes a grease trap assembled to the shaft intermediate the bearing and the gear; and the grease trap and the lower opening are cooperatively sized to permit the grease trap to fit through the lower opening.

8. A method for mounting a drive arrangement on a machine having upper and lower deck members, and wherein (a) the upper deck member has an opening therethrough, and (b) the drive arrangement has a shaft, the method including the steps of:

assembling a bearing and a bearing housing to the shaft, such bearing housing having an attachment flange;

lowering the bearing, bearing housing and shaft through the opening; and coupling the attachment flange to the lower deck member.

9. The method of claim 8 wherein:

the opening through the upper deck member is a first opening;

the lower deck member has a second opening therethrough;

the assembling step includes assembling a pinion gear to the shaft; and the lowering step includes lowering the pinion gear through both openings.

10. The method of claim 9 wherein the assembling step also includes assembling a grease trap to the shaft and the lowering step includes lowering the pinion gear and the grease trap through both openings.

11. The method of claim 8 wherein the lower deck member has an upper surface and the coupling step includes mounting the attachment flange to the upper surface.

* * * * *